(12) United States Patent　　　　(10) Patent No.: US 12,633,285 B2

Yoshimoto　　　　　　　　　　　　　　(45) Date of Patent: May 19, 2026

(54) INFORMATION PROCESSING APPARATUS AND NON-TRANSITORY COMPUTER READABLE MEDIA STORING PROGRAM

(71) Applicant: THE UNIVERSITY OF TOKYO, Tokyo (JP)

(72) Inventor: Hiromasa Yoshimoto, Tokyo (JP)

(73) Assignee: THE UNIVERSITY OF TOKYO (JP)

( * ) Notice: Subject to any disclaimer, the term of this patent is extended or adjusted under 35 U.S.C. 154(b) by 278 days.

(21) Appl. No.: 17/824,007

(22) Filed: May 25, 2022

(65) Prior Publication Data

US 2022/0383855 A1　　Dec. 1, 2022

(30) Foreign Application Priority Data

May 26, 2021　　(JP) ................................. 2021-088519

(51) Int. Cl.

| | |
|---|---|
| *G10L 15/08* | (2006.01) |
| *G06F 3/14* | (2006.01) |
| *G10L 15/22* | (2006.01) |
| *G10L 25/57* | (2013.01) |

(52) U.S. Cl.

CPC ................ *G10L 15/08* (2013.01); *G06F 3/14* (2013.01); *G10L 15/22* (2013.01); *G10L 25/57* (2013.01)

(58) Field of Classification Search

CPC ................................ G10L 15/08; G10L 15/22

See application file for complete search history.

(56) References Cited

U.S. PATENT DOCUMENTS

| | | | | |
|---|---|---|---|---|
| 11,323,278 | B1 * | 5/2022 | Adlersberg | ......... H04L 12/1831 |
| 11,765,324 | B1 * | 9/2023 | Fu | ......... H04N 23/661 |
| | | | | 348/143 |
| 2011/0228921 | A1 * | 9/2011 | Singh | .................. H04L 12/1831 |
| | | | | 379/202.01 |
| 2012/0030263 | A1 * | 2/2012 | John | ........................ G06F 16/48 |
| | | | | 707/825 |

(Continued)

FOREIGN PATENT DOCUMENTS

| | | |
|---|---|---|
| JP | 2012-243131 A | 12/2012 |
| JP | 2020-144906 A | 9/2020 |

OTHER PUBLICATIONS

Office Action issued in the corresponding Japanese Patent Application No. 2021-088519; mailed on Nov. 26, 2024 (total 14 pages).

*Primary Examiner* — Bryan S Blankenagel

(74) *Attorney, Agent, or Firm* — Harness, Dickey & Pierce, P.L.C.

(57) ABSTRACT

An information processing apparatus and a non-transitory computer readable media storing a program are provided to learn classification of utterances by a person or confirm a classification result. According to an aspect of the present invention, provided is an information processing apparatus comprising a processor configured to execute a program so as to: in a display information generation step, generate first display information for displaying a plurality of objects associated with each of options, wherein the option corresponds to type of utterance defined according to conversation information; and in a selection information generation step, generate selection information associated with option corresponding to the selected object and time of the selection each time any of the objects is selected.

20 Claims, 11 Drawing Sheets

(56)                  References Cited

U.S. PATENT DOCUMENTS

| | | | |
|---|---|---|---|
| 2013/0198224 A1* | 8/2013 | Sharma | G06F 16/90328 |
| | | | 707/769 |
| 2013/0246063 A1* | 9/2013 | Teller | G10L 13/033 |
| | | | 704/235 |
| 2016/0210687 A1* | 7/2016 | Grace | G06Q 30/0643 |
| 2019/0087391 A1* | 3/2019 | Cranshaw | G06F 40/151 |
| 2021/0142827 A1* | 5/2021 | Allen | G11B 27/036 |
| 2021/0168100 A1* | 6/2021 | Wu | H04L 51/214 |
| 2021/0357580 A1* | 11/2021 | Silano | G06F 40/177 |

* cited by examiner

[FIG. 1]
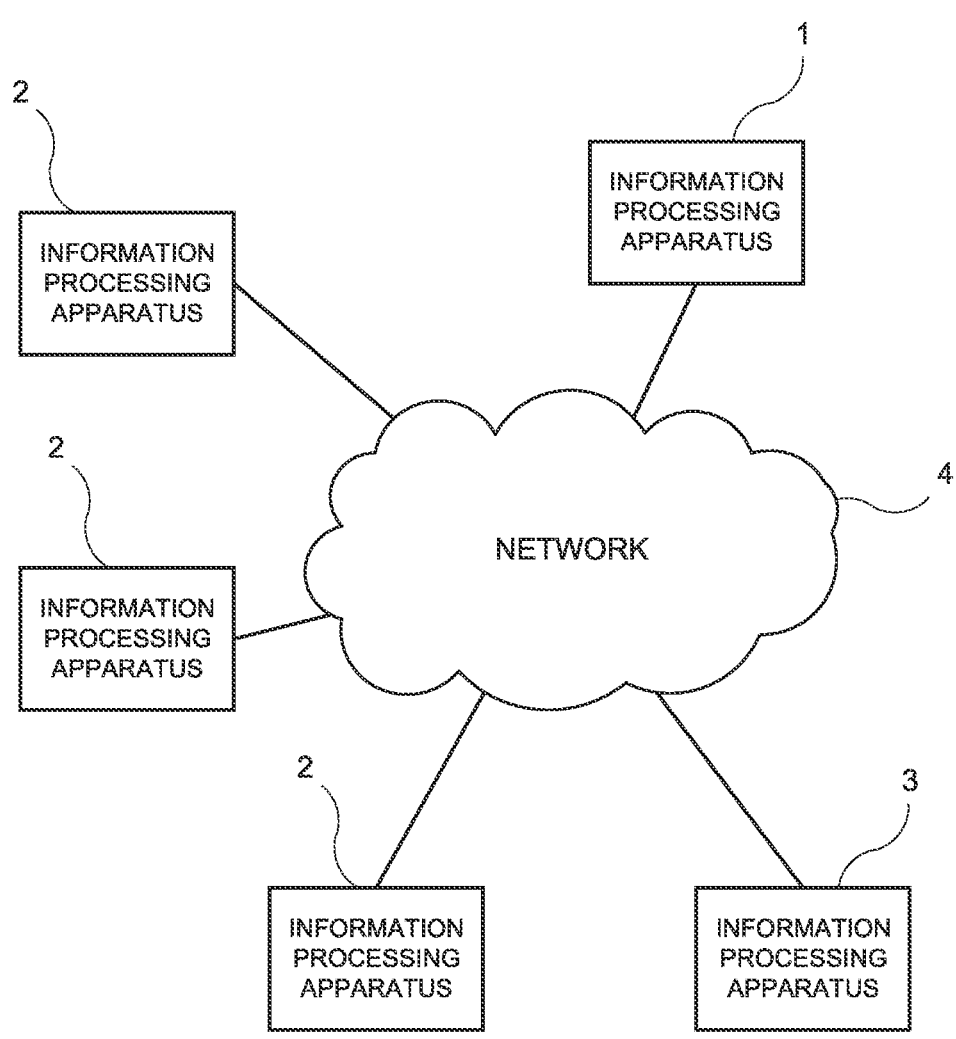

[FIG. 2]
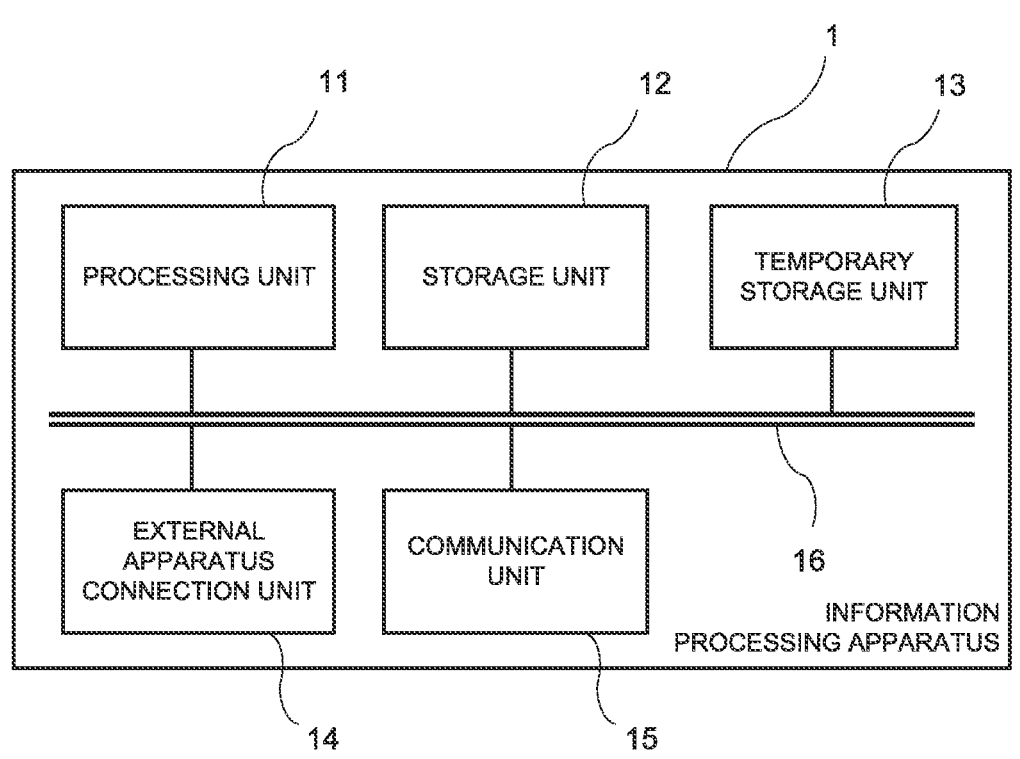

[FIG. 3]
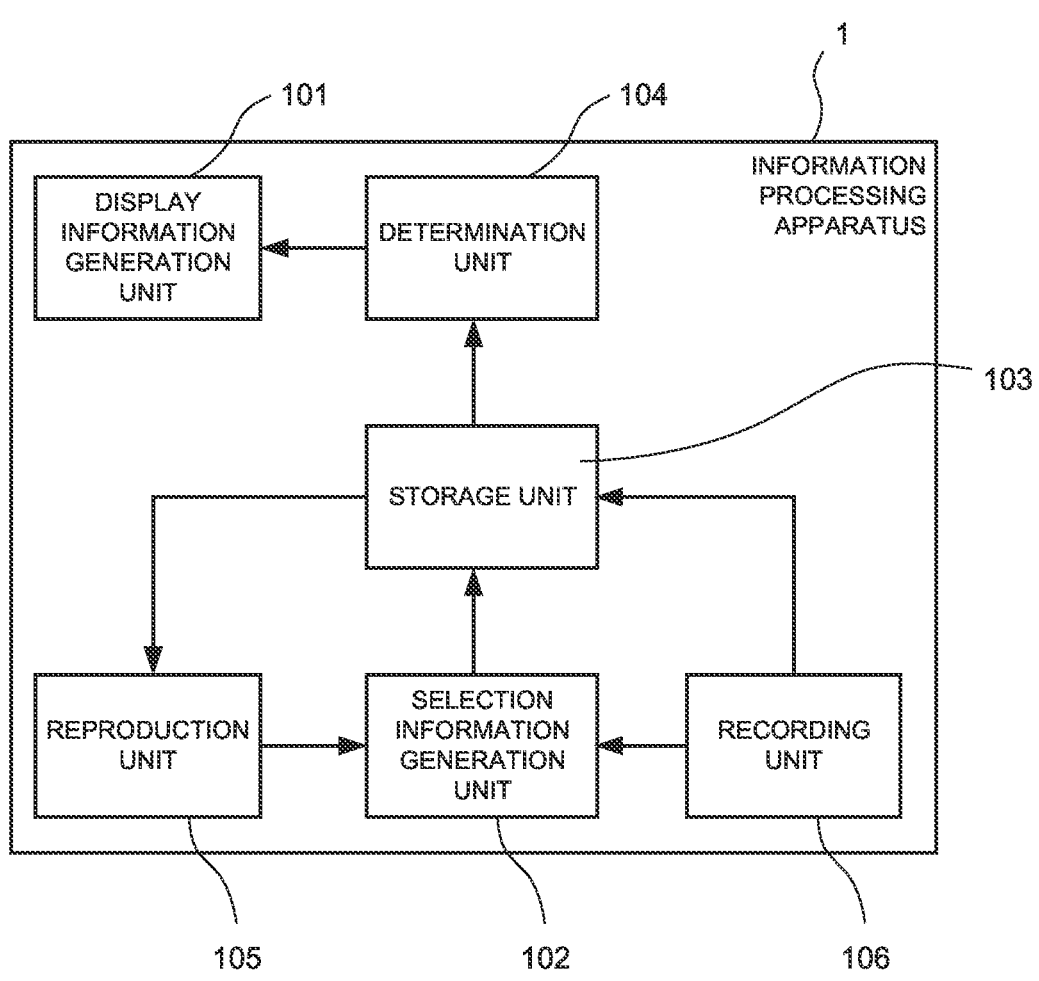

[FIG. 4]
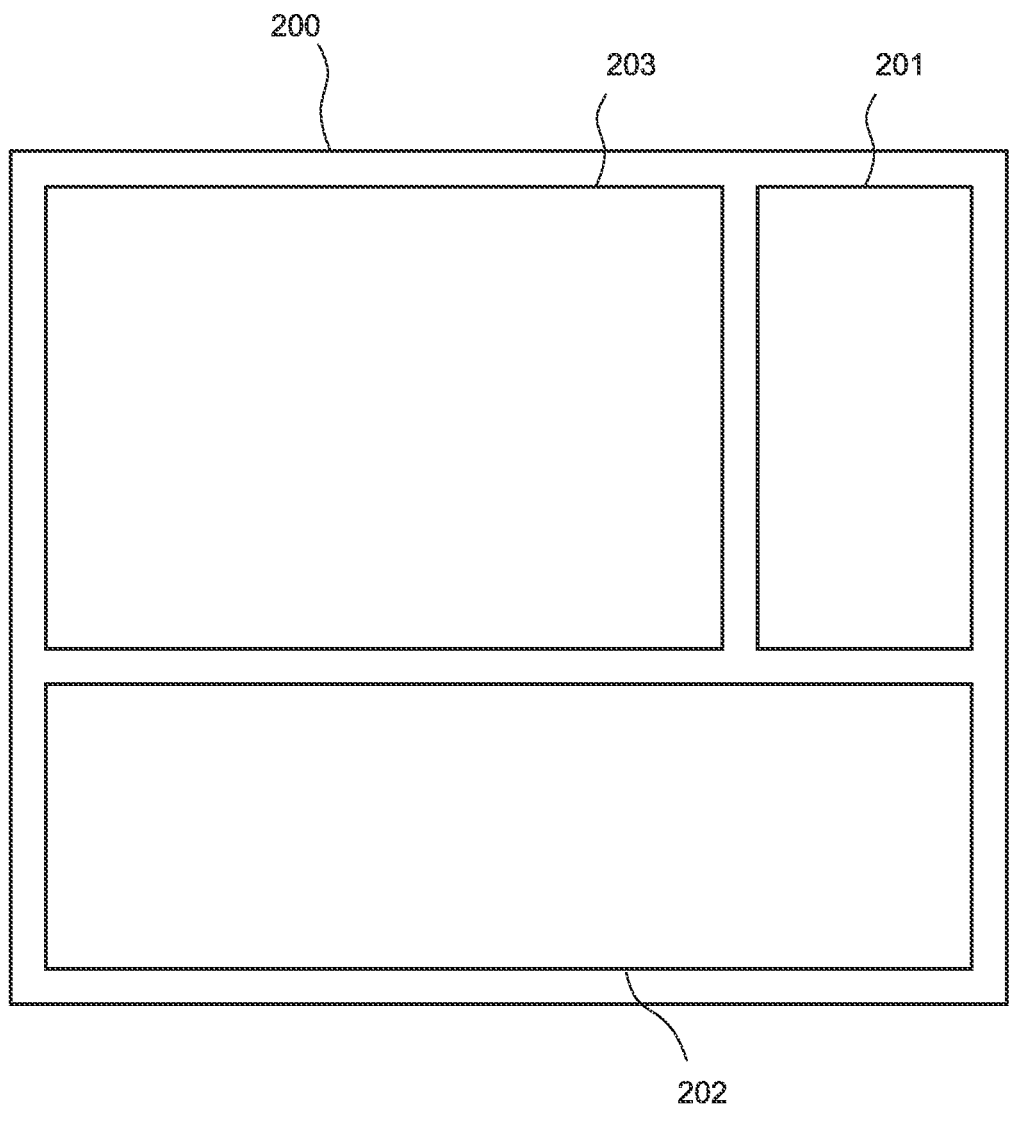

[FIG. 5]
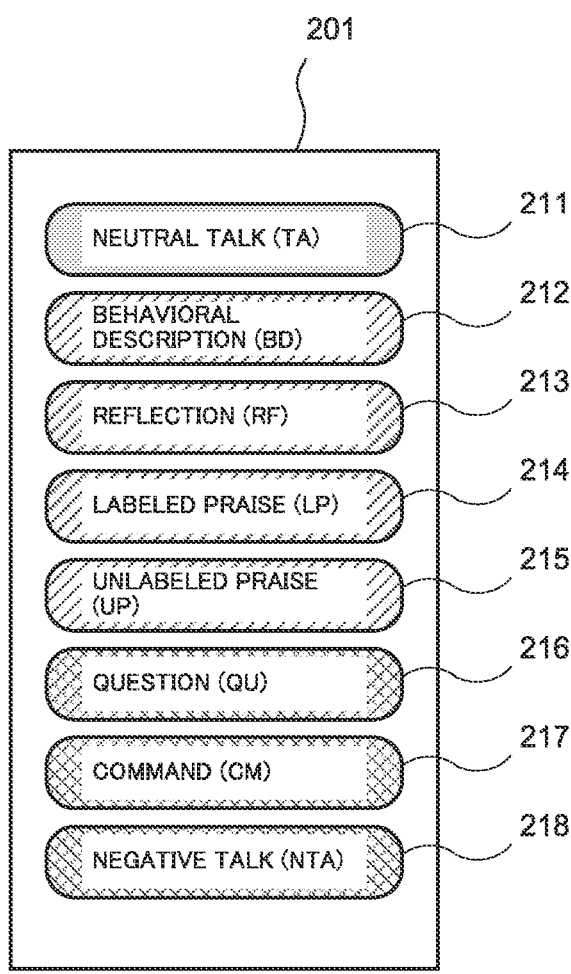

[FIG. 6]
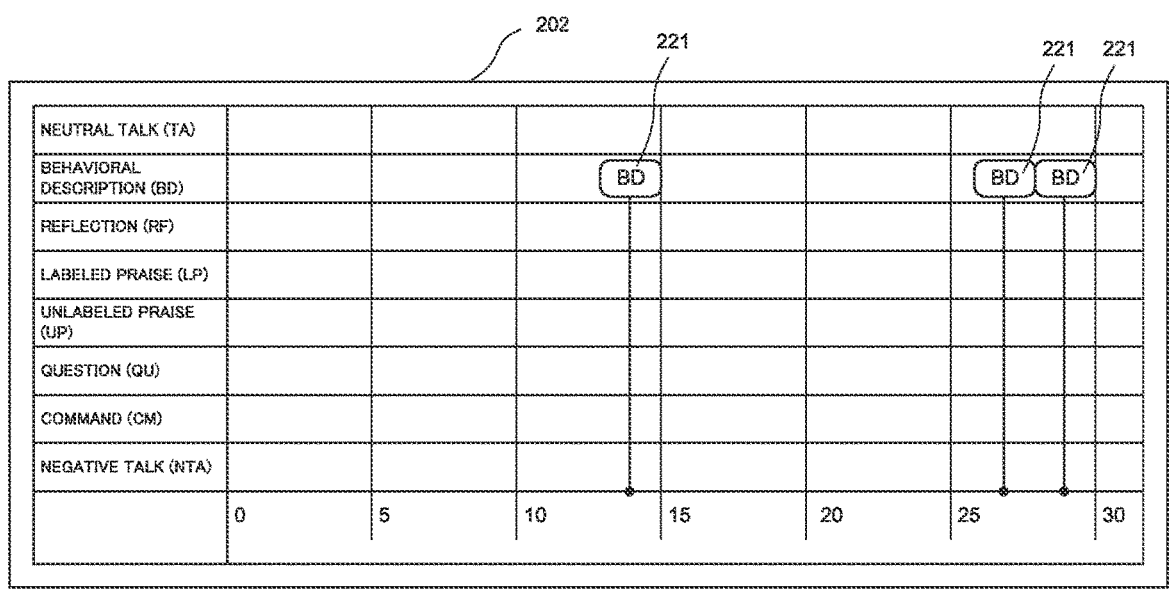
| | | | | | | | |
|---|---|---|---|---|---|---|---|
| NEUTRAL TALK (TA) | | | | | | | |
| BEHAVIORAL DESCRIPTION (BD) | | | BD | | | BD´ BD´ | |
| REFLECTION (RF) | | | | | | | |
| LABELED PRAISE (LP) | | | | | | | |
| UNLABELED PRAISE (UP) | | | | | | | |
| QUESTION (QU) | | | | | | | |
| COMMAND (CM) | | | | | | | |
| NEGATIVE TALK (NTA) | | | | | | | |
| | 0 | 5 | 10 | 15 | 20 | 25 | 30 |

[FIG. 7]
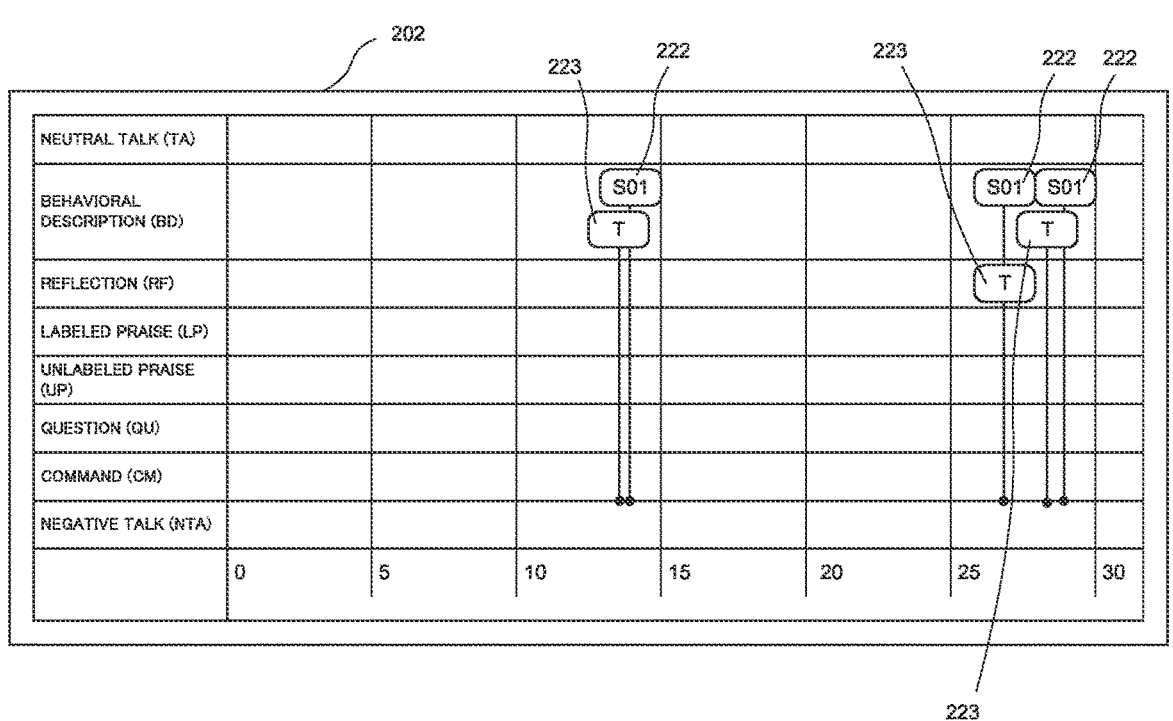

[FIG. 8]
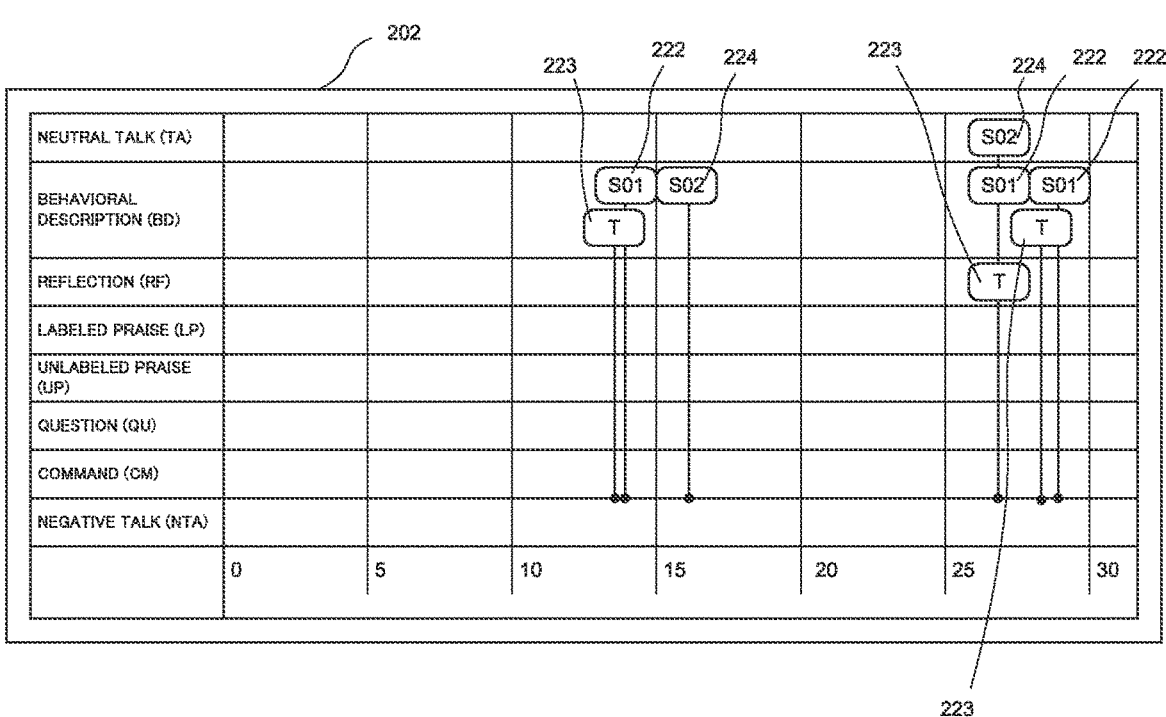

【FIG. 9】
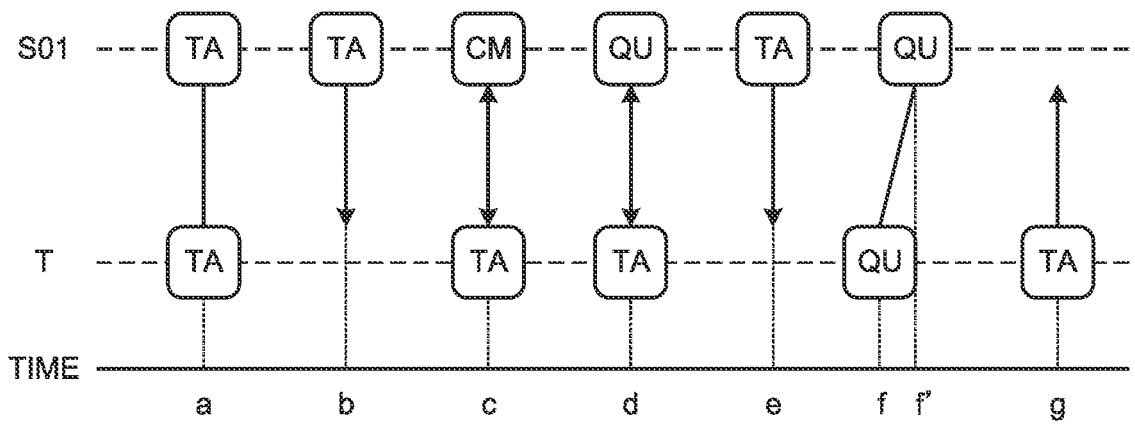

【FIG. 10】
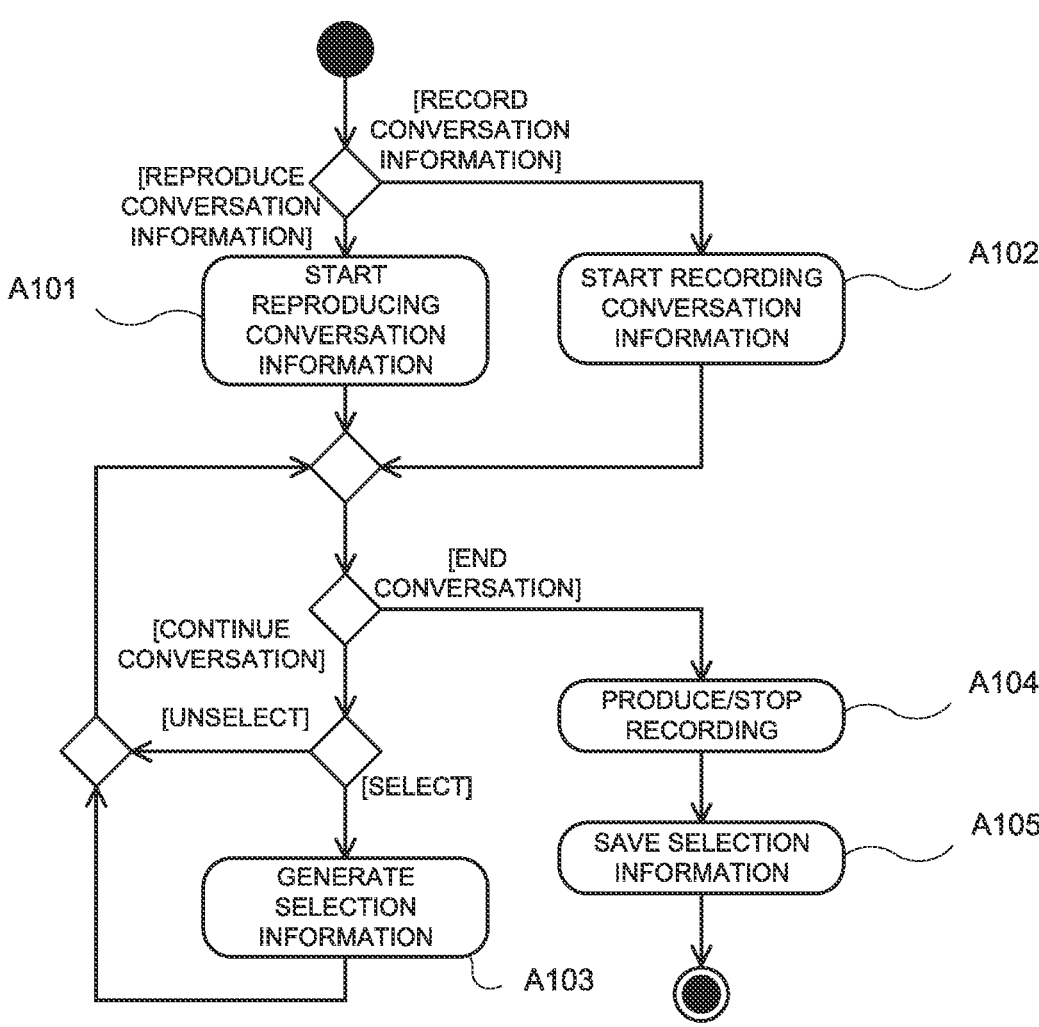

【FIG. 11】
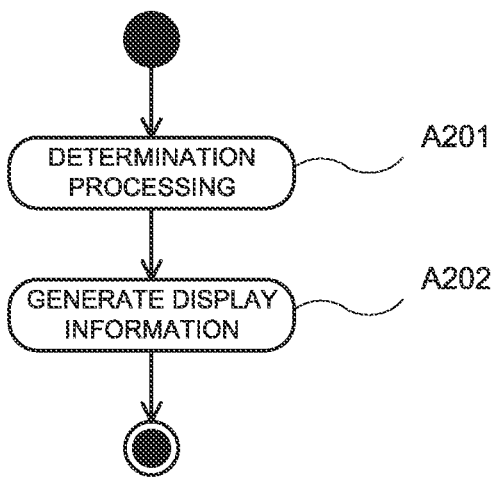

INFORMATION PROCESSING APPARATUS AND NON-TRANSITORY COMPUTER READABLE MEDIA STORING PROGRAM

CROSS REFERENCE TO RELATED APPLICATIONS

The present application claims priority under 35 U.S.C. § 119 to Japanese Patent Application No. 2021-88519, filed May 26, 2021.

BACKGROUND

Technical Field

The present invention relates to an information processing apparatus and a non-transitory computer readable media storing a program.

Related Art

In Japanese Patent Application Publication No. 2020-144906, a technique for classifying utterances in a conversation has been proposed.

By the way, regarding classification of utterances, there is also a demand that people do not need classification result but need to learn for the classification of utterances. For instance, when training trainer or therapist for Parent Child Interaction Therapy (hereinafter referred to as PCIT), training or the like for classifying utterances is required.

In view of the above circumstances, the present invention aims to provide an information processing apparatus and a non-transitory computer readable media storing a program capable of learning classification of utterances by a person or confirming a classification result.

SUMMARY

According to an aspect of the present invention, provided is an information processing apparatus comprising a processor configured to execute a program so as to: in a display information generation step, generate first display information for displaying a plurality of objects associated with each of options, wherein the option corresponds to type of utterance defined according to conversation information; and in a selection information generation step, generate selection information associated with option corresponding to the selected object and time of the selection each time any of the objects is selected.

According to one aspect of the present invention, it is possible to easily learn the classification of utterances or the like.

BRIEF DESCRIPTION OF THE DRAWINGS

FIG. 1 is a diagram showing an example of configuration of a system according to an embodiment of the present invention.

FIG. 2 is a diagram showing a configuration of an information processing apparatus 1.

FIG. 3 is a block diagram showing a functional configuration of the information processing apparatus 1.

FIG. 4 is a diagram showing a display example of a screen.

FIG. 5 is a diagram showing a display example of a first area.

FIG. 6 is a diagram showing a display example of a second display area.

FIG. 7 is a diagram showing classification results by two selectors.

FIG. 8 is a diagram showing classification results by three selectors.

FIG. 9 is a diagram showing a correspondence example of a classification result.

FIG. 10 is an activity diagram showing an operation flow of the information processing apparatus 1.

FIG. 11 is an activity diagram showing an operation flow of the information processing apparatus 1.

DETAILED DESCRIPTION

Hereinafter, embodiments of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of a circuit, a circuitry, a processor, a memory, and the like. In other words, it is a circuit includes application specific integrated circuit (ASIC), programmable logic device (e.g., simple programmable logic device (SPLD), complex programmable logic device (CPLD), and field programmable gate array (FPGA)), and the like.

Overall Configuration

FIG. 1 is a diagram showing an example of configuration of a system according to an embodiment of the present invention. As shown in FIG. 1, the system comprises an information processing apparatus 1, an information processing apparatus 2, and an information processing apparatus 3, which are communicatively connected via a network 4.

The information processing apparatus 1 functions as a server, performing generation of display information to be displayed on the information processing apparatus 2 and reception of an operation content on the information processing apparatus 2. The information processing apparatus 1 can also provide conversation information and acquire selection information for information processing apparatus 3.

The information processing apparatus 2 is used by a selector, e.g., a learner who performs learning, and functions as a client. The information processing apparatus 2 needs to be communicable with the information processing apparatus 1 during operation.

The information processing apparatus 3 is used by a selector and can be used without communicating with the information processing apparatus 1. However, it is desirable to be communicable with the information processing apparatus 1 before and after use by the selector.

The network 4 is a network that enables communication between the information processing apparatus 1, the information processing apparatus 2, and the information processing apparatus 3, and includes, for example, Internet.

2. Configuration of Information Processing Apparatus

Next, configuration of the information processing apparatus 1 will be illustrated. FIG. 2 is a diagram showing configuration of the information processing apparatus 1. As shown in FIG. 2, the information processing apparatus 1 comprises a processing unit 11, a storage unit 12, a temporary storage unit 13, an external apparatus connection unit 14, and a communication unit 15, and these components are electrically connected within the information processing apparatus 1 via a communication bus 16.

The processing unit 11 is realized by, for instance, a central processing unit (CPU), and operates according to a predetermined program stored in the storage unit 12 to realize various functions.

The storage unit 12 is a nonvolatile storage medium that stores various information. It can be realized by a storage device such as a hard disk drive (HDD) or a solid state drive (SSD). The storage unit 12 can be placed in another apparatus capable of communicating with the information processing apparatus 1.

The temporary storage unit 13 is a volatile storage medium. It can be realized by a memory such as a random access memory (RAM), and temporarily stores necessary information (arguments, sequences, etc.) for the processing unit 11 to operate.

The external apparatus connection unit 14 is a connection unit conforming to a standard such as a universal serial bus (USB) or a high-definition multimedia interface (HDMI), and can connect an input device such as a keyboard or a display device such as a monitor.

The communication unit 15 is, for example, a communication means conforming to a local area network (LAN) standard, and realizes communication between the information processing apparatus 1 and a network 4 such as a local area network or the Internet via this network.

A computer, a personal computer, or the like for general-purpose server can be used for the information processing apparatus 1, and the information processing apparatus 1 can be configured by using a plurality of computers.

Since the configurations of the information processing apparatus 2 and the information processing apparatus 3 are the same as the configuration of the information processing apparatus 1, the illustration thereof will be omitted.

3. Function of Information Processing Apparatus 1

Next, function of the information processing apparatus 1 will be illustrated. The information processing apparatus 1 performs processing to support a person learning classification of utterances and operates according to a program to realize each of the functional units described below. The program is a program that allows a computer to operate or function as an information processing apparatus.

FIG. 3 is a block diagram showing functional configuration of the information processing apparatus 1. As shown in FIG. 3, the information processing apparatus 1 comprises a display information generation unit 101, a selection information generation unit 102, a storage unit 103, a determination unit 104, a reproduction unit 105, and a recording unit 106.

The display information generation unit 101 is configured to generate first display information displaying a plurality of objects associated with each of options. The first display information is information to be displayed on a screen of the information processing apparatus 2, and the object is, for example, a selection button. The options correspond to types of utterances defined according to conversation information, which are eight types in the case of PCIT: Neutral Talk (TA), Behavioral Description (BD), Reflection (RF), Labeled Praise (LP), Unlabeled Praise (UP), Question (QU), Command (CM), and Negative Talk (NTA). Display example of screen based on the first display information will be described later. The information processing apparatus 3 also comprises a functional unit corresponding to the display information generation unit 101, and this functional unit generates first display information as information to be displayed on a screen of the information processing apparatus 3.

Based on the selection information described later, the display information generation unit 101 generates second display information in which a symbol representing the option is arranged in response to time corresponding to the option. The second display information is information to be displayed on a screen of the information processing apparatus 2, and the symbol is either a character, a character string, a mark, or an icon. The symbol is arranged on a time axis. Further, the information processing apparatus 3 also generates the second display information as information to be displayed on a screen of information processing apparatus 3.

The selection information generation unit 102 generates selection information associated with option corresponding to the selected object and time of the selection each time any of the objects is selected. Specifically, when a selector (learner) who operates the information processing apparatus 2 presses a selection button corresponding to an utterance in a conversation while listening to the conversation, the information processing apparatus 1 is notified of this fact, and the selection information generation unit 102 generates selection information corresponding to content of the notified option and the time the selection button was pressed. In the case of PCIT, the conversation is a parent-child conversation. In the case of the information processing apparatus 3, selection information is generated in response to selection operation of the selection button for the information processing apparatus 3.

The selection information generation unit 102 may include information of the selector (learner) who selected the object in selection information to be generated. When the selection information includes information of the selector, the second display information generated by the display information generation unit 101 may be configured to identify the symbol as a first symbol corresponding to the selection information generated by selection of a first selector and a second symbol corresponding to the selection information generated by selection of a second selector.

The storage unit 103 stores the selection information generated by the selection information generation unit 102. The storage unit 103 also stores conversation information reproduced by the reproduction unit 105 as well as conversation information recorded by the recording unit 106, which will be described later. The storage unit 103 functions as an operation to store the selection information and the conversation information or to read out the stored selection information and the conversation information by the program, and the storage of the selection information and the conversation information is performed by the storage unit 12.

The determination unit 104 is configured to determine a correspondence between the selection information generated by the selection of the first selector and the selection information generated by the selection of the second selector. For determination of correspondence, for instance, if the option selected by the first selector is consistent with the option selected by the second selector, and the time selected by both selectors match, the two are determined to correspond with each other. However, a predetermined error may be allowed for time. On the other hand, if the contents of the two options are inconsistent, or if only one of them performs a selection, etc., it is determined that the two do not correspond with each other.

If the determination unit 104 performed a determination, the display information generation unit 101 generates the second display information includes an indication of the correspondence between the first symbol and the second symbol. For instance, the second display information displays the first symbol and the second symbol that do not correspond to the selection information generated by the selection of the first selector and the selection information generated by the selection of the second selector, and if the selection information generated by the selection of the first selector corresponds to the selection information generated by the selection of the second selector, the first symbol and the second symbol are non-displayed.

The reproduction unit 105 is configured to reproduce the conversation information. The conversation information includes audio recording of conversation of a subject. The conversation of the subject is, for example, a parent-child conversation. When the reproduction unit 105 reproduces the conversation information, the selection information generation unit 102 allows the time to correspond to the conversation information. For example, the time is included in the selection information based on the start time of reproduction of the conversation information.

The conversation information may also include a video recording of the subject. In this case, the video is displayed on a screen of the information processing apparatus 2 or a screen of the information processing apparatus 3 as a third display information.

The recording unit 106 is configured to record the conversation information. The recording unit 106 is not always necessary, and may be used when creating conversation information, when operating the information processing apparatus 3 in front of the subject, or the like.

4. Example of Screen Display

Next, example of screen display of the information processing apparatus 2 or the information processing apparatus 3 will be described. FIG. 4 is a diagram showing an example of a screen display. As shown in FIG. 4, a screen 200 displayed on the information processing apparatus 2 or the information processing apparatus 3 includes a first display area 201, a second display area 202, and a third display area 203. The first display area 201 is an area where display based on the first display information generated by the display information generation unit 101 is performed. The second display area 202 is an area where display based on the second display information generated by the display information generation unit 101 is performed. The third display area 203 is an area where a display based on the third display information is performed when the reproduction unit 105 reproduces a video.

The first display area 201 displays a plurality of objects, as shown in FIG. 5. FIG. 5 is a diagram showing a display example of first area. As shown in the figure, in the first display area 201, a button 211, a button 212, a button 213, a button 214, a button 215, a button 216, a button 217, and a button 218 are displayed as objects. The example shown here is for use in learning when training PCIT trainer or therapist, and each button is assigned to option of Neutral Talk (TA), Behavioral Description (BD), Reflection (RF), Labeled Praise (LP), Unlabeled Praise (UP), Question (QU), Command (CM), and Negative Talk (NTA). These options are capable of classifying Neutral Talk (TA) as a first group, classifying Behavioral Description (BD), Reflection (RF), Labeled Praise (LP), and Unlabeled Praise (UP) as a second group, and classifying Question (QU), Command (CM), and Negative Talk (NTA) as a third group, thus the button 211 is displayed in a first color, the button 212, the button 213, the button 214, and the button 215 are displayed in a second color, and the button 216, the button 217, and the button 218 are displayed in a third color.

The button 211, the button 212, the button 213, the button 214, the button 215, the button 216, the button 217, and the button 218 are used for the selector (learner or instructor) to classify the utterance into one of the eight types and press the button according to the classification result when listening to a conversation between a parent and a child who are subjects and the utterance occurs on the parent side.

In the second display area 202, a display as shown in FIG. 6 is performed. FIG. 6 is a diagram showing a display example of the second display area. In the example shown in FIG. 6, a symbol 221 is displayed on a time axis. The symbol 221 is displayed based on the selection information generated when the selector (learner or instructor) presses the button displayed in the first display area 201. In the example shown in FIG. 6, it is shown that the button 212 is pressed at 14 seconds, 27 seconds, and 29 seconds. The display in the second display area 202 can be scrolled horizontally, that is, along the time axis. The example shown in FIG. 6 is displayed while the selector is classifying the utterance or when the selector confirms only his/her own classification result.

The selector can also compare the classification result of the utterance with classification result by other person, in which case display as shown in FIG. 7 or FIG. 8 is performed in the second display area 202. FIG. 7 shows classification results by two selectors, and FIG. 8 shows the classification results by three selectors. In the example shown in the figures, classification result of selector (learner) to which identification information "S01" is assigned is represented by a symbol 222, classification result of selector (instructor) to which identification information "T" is assigned is represented by a symbol 223, and classification result of selector (learner) to which identification information "S02" is assigned is represented by a symbol 224.

By the way, when displaying the classification results by a plurality of selectors, it is possible to display only consistent classification results, only inconsistent classification results, or the like. To determine whether the classification results coincident or not, it is necessary to identify correspondence between the two. The correspondence between the two can be specified, for instance, as shown in FIG. 9. FIG. 9 is a diagram showing a correspondence example of the classification results. For the classification results shown at time a in the figure, both the selection content and the selection time are coincident. In other words, they are matched. For the classification result shown at time b in the same figure, although the selector with the identification information "S01" performs the classification, the selector with the identification information "T" does not perform the classification, thus the two are inconsistent. For the classification results shown at time c in the same figure, even though the selection time are coincident, the selection contents are different, thus the two are inconsistent. The classification results shown at time d in the same figure are also inconsistent. The classification results shown at time e in the same figure are also inconsistent as in the case of time b. The classification results at time f and time f in the same figure are identified as consistent because, although there is a difference in the selection time, the difference is within an acceptable range and the selection contents are consistent. For the classification result at time b in the same figure, although the selector with the identification information "T" performs the classification, the selector with the identification information "S01" does not perform the classification, thus the two are inconsistent.

The correspondence of the classification results can be specified based on the distance between the two, and can be performed, for example, by using dynamic time warping (DTW). Of course, it is also possible to use other methods, e.g., algorithm for calculating distance between words used for spell checking.

In the third display area 203, display is performed when the reproduction unit 105 operates. When a video is reproduced, an object for operating the video and the reproduction of the video, such as a seek bar indicating reproduction position, a reproduction button, a pause button, a 10-second forward button, or a 10-second backward button, are displayed. Further, when only audio is reproduced, only the same object is displayed.

5. Operation of Information Processing Apparatus 1

Next, operation of the information processing apparatus 1 will be described. FIGS. 10 and 11 are activity diagrams showing operation flow of the information processing apparatus 1.

First, operation of the information processing apparatus 1 at time of classification of utterances will be described. When the information processing apparatus 1 starts the operation, the reproduction unit 105 starts reproducing the conversation information when the conversation information is reproduced (A101), and the recording unit 106 starts recording the conversation information when classification of utterances is performed in front of the subject (A102). Then, while conversation continues, the selection information generation unit 102 generates selection information for each selection of the classification of utterances by the selector (A103). When the conversation ends, the reproduction of the conversation information by the reproduction unit 105 or the recording of the conversation information by the recording unit 106 is stopped (A104), and the selection information generation unit 102 save the selection information as a file (A105), the process ends. The selection information saved as file is associated with the conversation information or saved as a single file.

Subsequently, operation of the information processing apparatus 1 at the time of confirming the classification of utterances will be described. When the information processing apparatus 1 starts operation, the determination unit 104 determines the correspondence of classification result (A201) first, based on the result, the display information generation unit 101 then generates the second display information (A202). The determination of the correspondence of classification result can be omitted.

It should be noted that the operation flow described above is only an example.

5. Others

Although the case of learning according to PCIT is described above, the information processing apparatus 1 and the information processing apparatus 3 can also be used for other purposes, such as research or reflection of business negotiation or meeting.

The present invention may be provided in each of the following aspects.

The information processing apparatus, wherein: the processor is configured to execute the program so as to in the display information generation step, generate second display information in which a symbol representing the option is arranged in response to time corresponding to the option based on the selection information.

The information processing apparatus, wherein: the symbol is either a character, a character string, a mark, or an icon, and in the second display information, the symbol is arranged on a time axis.

The information processing apparatus, wherein: the selection information includes information of a selector who selected the object, and the second display information is configured to identify the symbol as a first symbol corresponding to the selection information generated by selection of a first selector and a second symbol corresponding to the selection information generated by selection of a second selector.

The information processing apparatus, wherein: the processor is configured to execute the program further so as to in a determination step, determine a correspondence between the selection information generated by the selection of the first selector and the selection information generated by the selection of the second selector, wherein the second display information includes an indication of the correspondence between the first symbol and the second symbol.

The information processing apparatus, wherein: the second display information is configured to display the first symbol and the second symbol that do not correspond to the selection information generated by the selection of the first selector and the selection information generated by the selection of the second selector.

The information processing apparatus, wherein: the processor is configured to execute the program so as to in a reproduction step, reproduce the conversation information, wherein the conversation information includes audio recording of conversation of a subject, and the time corresponds to the conversation information.

The information processing apparatus, wherein: the conversation information includes a video recording of a subject.

The information processing apparatus, wherein: the processor is configured to execute the program so as to in a recording step, record the conversation information.

A non-transitory computer readable media storing a program, allowing a computer to operate as an information processing apparatus, wherein: the program allows the computer to function as the information processing apparatus.

Of course, the above aspects are not limited thereto.

What is claimed is:

1. An information processing apparatus comprising:
   a processor configured to execute a program so as to:
   cause a display to display a plurality of objects, the plurality of objects being configured to be selected by a plurality of selectors who have heard a conversation of subjects, one of the plurality of objects corresponding to one of a plurality of utterance types, the one of the plurality of utterance types being included in the conversation;
   cause the display to display a plurality of rows, the plurality of rows corresponding to the plurality of utterance types, respectively, an extending direction of each of the plurality of rows being along a time-series indicator;

cause the display to display an interface for reproducing a video or an audio of the conversation, the interface being configured with a seek bar and a plurality of operation buttons;

receive a first selection input from a first selector of the plurality of selectors while reproducing the conversation by operating the interface and information of a first time, the first selection input corresponding to a first object of the plurality of objects, the first object corresponding to a first utterance type of the plurality of utterance types included in the conversation, the first time representing a time at which the first object has been selected by the first selector;

generate a first symbol corresponding to the first selection input;

cause the display to display the first symbol in a first row of the plurality of rows corresponding to the first utterance type at a first position indicating the first time along the time-series indicator;

receive a second selection input from a second selector of the plurality of selectors while reproducing the conversation by operating the interface and information of a second time, the second selection input corresponding to a second object of the plurality of objects, the second object corresponding to a second utterance type of the plurality of utterance types included in the conversation, the second time representing a time at which the second object has been selected by the second selector;

generate a second symbol corresponding to the second selection input;

cause the display to display the second symbol in a second row of the plurality of rows corresponding to the second utterance type at a second position indicating the second time along the time-series indicator; and cause, upon receiving both the first and second selection inputs, the display to selectively display only a consistent comparison result or only an inconsistent comparison result based on comparison between the first and second selection inputs.

2. The information processing apparatus according to claim 1, wherein the processor is further configured to: to cause the display to display the consistent comparison result under a condition in which:

the first utterance type and the second utterance type are the same, the first row and the second row are the same, and a difference between the first time and the second time is within a predetermined range.

3. The information processing apparatus according to claim 1, wherein the processor is further configured to cause the display to display the inconsistent comparison result under a condition in which:

the first utterance type and the second utterance type are different from each other; or the difference between the first time and the second time is outside the predetermined range.

4. The information processing apparatus according to claim 1, wherein the processor is further configured to cause the display to display the consistent comparison result under a condition in which:

the first utterance type and the second utterance type are the same, the first row and the second row are the same, and the first time and the second time are the same.

5. The information processing apparatus according to claim 1, wherein the processor is further configured to:

cause the display to display the video representing the conversation; and cause the display to display the first symbol at the first position indicating the first time in a synchronizing manner as a playing time of the video with respect to the conversation.

6. The information processing apparatus according to claim 5, wherein the display has a plurality of display areas including first, second, and third display areas, and the processor is further configured to:

cause the display to display the plurality of objects in the first display area;

cause the display to display the first and second symbols and the plurality of rows in the second display area; and cause the display to display the interface and the video in the third display area.

7. The information processing apparatus according to claim 1, wherein the processor is further configured to:

play the audio representing the conversation; and cause the display to display the first symbol at the first position indicating the first time in a synchronizing manner as a playing time of the audio with respect to the conversation.

8. The information processing apparatus according to claim 1, wherein the first symbol is either a character, a character string, a mark, or an icon, and the first symbol is arranged on a time axis along the time-series indicator in the display with respect to the conversation.

9. The information processing apparatus according to claim 1, wherein the processor is further configured to:

record the conversation of the subjects in a memory;

keep playing the recorded conversation in the memory while the processor receives a plurality of selection inputs from the first selector and information of a plurality of times, the plurality of selection inputs corresponding to one or more objects of the plurality of objects, the one or more objects corresponding to one or more utterance types of the plurality of utterance types included in the conversation, the plurality of times representing times at which the one or more objects have been selected by the first selector;

generate a plurality of symbols corresponding to the plurality of selection inputs; and cause the display to display, in the plurality of rows, the plurality of symbols at a plurality of positions indicating the one or more objects and the plurality of times along the time-series indicator.

10. The information processing apparatus according to claim 1, wherein the processor is further configured to:

cause the display to display the plurality of objects in order; and

cause the display to display the plurality of rows such that an order of the plurality of utterance types assigned to the plurality of rows matches the order of the plurality of objects corresponding to the plurality of utterance types, respectively.

11. A non-transitory computer readable medium storing a program, causing a computer to execute the program by a processor so as to perform the steps of:

causing a display to display a plurality of objects, the plurality of objects being configured to be selected by a plurality of selectors who have heard a conversation of subjects, one of the plurality of objects corresponding to one of a plurality of utterance types, the one of the plurality of utterance types being included in the conversation;

causing the display to display a plurality of rows, the plurality of rows corresponding to the plurality of utterance types, respectively, an extending direction of each of the plurality of rows being along a time-series indicator;

causing the display to display an interface for reproducing a video or an audio of the conversation, the interface being configured with a seek bar and a plurality of operation buttons;

receiving a first selection input from a first selector of the plurality of selectors while reproducing the conversation by operating the interface and information of a first time, the first selection input corresponding to a first object of the plurality of objects, the first object corresponding to a first utterance type of the plurality of utterance types included in the conversation, the first time representing a time at which the first object has been selected by the first selector;

generating a first symbol corresponding to the first selection input;

causing the display to display the first symbol in a first row of the plurality of rows corresponding to the first utterance type at a first position indicating the first time along the time-series indicator;

receiving a second selection input from a second selector of the plurality of selectors while reproducing the conversation by operating the interface and information of a second time, the second selection input corresponding to a second object of the plurality of objects, the second object corresponding to a second utterance type of the plurality of utterance types included in the conversation, the second time representing a time at which the second object has been selected by the second selector;

generating a second symbol corresponding to the second selection input;

causing the display to display the second symbol in a second row of the plurality of rows corresponding to the second utterance type at a second position indicating the second time along the time-series indicator; and causing, upon receiving both the first and second selection inputs, the display to selectively display only a consistent comparison result or only an inconsistent comparison result based on comparison between the first and second selection inputs.

12. The non-transitory computer readable medium according to claim 11, wherein the processor is further configured to cause the display to display the consistent comparison result under a condition in which:

the first utterance type and the second utterance type are the same, the first row and the second row are the same, and a difference between the first time and the second time is within a predetermined range.

13. The non-transitory computer readable medium according to claim 11, wherein the processor is further configured to cause the display to display the inconsistent comparison result under a condition in which:

the first utterance type and the second utterance type are different from each other; or the difference between the first time and the second time is outside the predetermined range.

14. The non-transitory computer readable medium according to claim 11, wherein the processor is further configured to cause the display to display the consistent comparison result under a condition in which:

the first utterance type and the second utterance type are the same, the first row and the second row are the same, and the first time and the second time are the same.

15. The non-transitory computer readable medium according to claim 11, wherein the processor is further configured to:

cause the display to display the video representing the conversation; and cause the display to display the first symbol at the first position indicating the first time in a synchronizing manner as a playing time of the video with respect to the conversation.

16. The non-transitory computer readable medium according to claim 15, wherein the display has a plurality of display areas including first, second, and third display areas, and the processor is further configured to:

cause the display to display the plurality of objects in the first display area;

cause the display to display the first and second symbols and the plurality of rows in the second display area; and cause the display to display the interface and the video in the third display area.

17. The non-transitory computer readable medium according to claim 11, wherein the processor is further configured to:

play the audio representing the conversation; and cause the display to display the first symbol at the first position indicating the first time in a synchronizing manner as a playing time of the audio with respect to the conversation.

18. The non-transitory computer readable medium according to claim 11, wherein the first symbol is either a character, a character string, a mark, or an icon, and the first symbol is arranged on a time axis along the time-series indicator in the display with respect to the conversation.

19. The non-transitory computer readable medium according to claim 11, wherein the processor is further configured to:

record the conversation of the subjects in a memory of the computer;

keep playing the recorded conversation in the memory while the processor receives a plurality of selection inputs from the first selector and information of a plurality of times, the plurality of selection inputs corresponding to one or more objects of the plurality of objects, the one or more objects corresponding to one or more utterance types of the plurality of utterance types included in the conversation, the plurality of times representing times at which the one or more objects have been selected by the first selector;

generate a plurality of symbols corresponding to the plurality of selection inputs; and cause the display to display, in the plurality of rows, the plurality of symbols at a plurality of positions indicating the one or more objects and the plurality of times along the time-series indicator.

20. The non-transitory computer readable medium according to claim 11, wherein the processor is further configured to:

cause the display to display the plurality of objects in order; and cause the display to display the plurality of rows such that an order of the plurality of utterance types assigned to the plurality of rows matches the order of the plurality of objects corresponding to the plurality of utterance types, respectively.

* * * * *